(12) United States Patent
Tong et al.

(10) Patent No.: US 6,353,198 B1
(45) Date of Patent: Mar. 5, 2002

(54) WELDED STATOR WINDING SPLICE JOINT FOR ROTARY ELECTRIC MACHINES AND METHOD OF FORMING THE SAME

(75) Inventors: Wei Tong; Zhangqing Zhuo, both of Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/594,541

(22) Filed: Jun. 14, 2000

(51) Int. Cl.[7] .................................................. B23K 9/00
(52) U.S. Cl. .................................. 219/56.22; 219/137 R
(58) Field of Search ....................... 219/56, 56.1, 56.22, 219/137 R, 127; 174/94 R

(56) References Cited

U.S. PATENT DOCUMENTS

| | | | | |
|---|---|---|---|---|
| 1,707,317 A | * | 4/1929 | Pipes | 174/94 R |
| 3,510,624 A | * | 5/1970 | Bennett | 174/94 R |
| 3,742,122 A | * | 6/1973 | Blavos et al. | 174/94 R |
| 4,225,770 A | * | 9/1980 | Moore et al. | 219/137 R |

* cited by examiner

Primary Examiner—Clifford C. Shaw
(74) Attorney, Agent, or Firm—Nixon & Vanderhye PC

(57) ABSTRACT

Welded stator winding splice joints are provided that utilize gas tungsten arc welding to offer high performance and reliability. The application of welded stator winding joints can significantly raise operation reliability of rotary electric machines such as turbine generator and induction motors, simplify the manufacturing process, and reduce the cost and product cycle time.

22 Claims, 6 Drawing Sheets

WELDED STATOR WINDING SPLICE JOINT FOR ROTARY ELECTRIC MACHINES AND METHOD OF FORMING THE SAME

BACKGROUND OF THE INVENTION

The present invention relates to stator winding splice joints and, more particularly, to welded stator winding splice joints utilizing gas tungsten arc welding to provide high performance and reliability.

A rotary electric machine such as a turbine generator generally comprises a stator having an iron core and a coil winding, and a rotor rotatably supported within the stator and having a core and coil winding. The annular stator core has a plurality of axially extended core teeth to form coil slots therebetween at regular intervals circumferentially of the inner surface of the stator core.

The function of the stator winding is to provide a well defined path for electric current flow to and from an external system at a prescribed terminal voltage level and temperature level. The stator winding coils are made up of bundles of strands of insulated copper wires that are disposed in the slots of the stator core. Referring to FIG. 1, at the ends of each coil, the copper wires are brazed together to form bar leads 10, 12. A pair of coils is connected by sandwiching the stator bar leads 10, 12 with two connection straps 14, 16 and brazing them together, as schematically shown at 18, to provide an electric current path. There are several dozen such conventional stator winding splice joints contained in a rotary electric machine. The failure of one splice joint can result in the failure of the entire stator winding. Thus, each splice joint plays an important role in ensuring the normal operation of the rotary electric machine. The reliability of each splice joint has a direct and strong impact on the reliability of the whole machine.

As noted above, brazing is conventionally used to join the stator coils. During brazing, the base metal is not melted. Thus, the filler metal is chosen to melt at a lower temperature than the base metal. Although brazing is widely used, brazing has numerous disadvantages. For example, because good brazing depends on the capillary flow of the filler metal, surface cleanliness in brazing is much more critical than other joining processes, such as welding. Any contamination on the brazing surfaces may cause the ultimate failure of the splice joint. Further, the filler material in many brazed joints is considerably weaker than the joint base material. In addition, brazing produces waste disposal and hazards that are harmful to the environment. Furthermore, distortion can be experienced in brazing and the evaluation of strength of brazed joints is more complex than that of welded joints. In summary, brazing usually has a relatively low reliability. In spite of these shortcomings, the conventional design of the stator winding splice joints employs brazing as the joint method.

BRIEF SUMMARY OF THE INVENTION

Gas tungsten arc welding (GTAW) is a high-precision, high-quality, high reliability, low cost and simple joining process. GTAW produces the coalescence of metals by heating them with an arc between a non-consumable tungsten-electrode and the base metal. During the welding process, an inert gas such as helium sustains the arc and protects the molten metal from atmospheric contamination and oxidation. The advantages of GTAW include the fact that it produces superior quality welds that are generally free of defects; it is free of the spatter that occurs in brazing processes; it can be used with or without a filler metal; it can be used with a wide range of power supplies; it allows precise control of welding penetration depths; it can produce inexpensive autogenous welds at high speeds; and it can be used to weld almost all metals.

As noted above, conventional splice joints employ brazing as the joining method. Because of the strict cleaning requirements for the brazing surfaces, the brazing process is rather time consuming and costly. It therefore would be desirable to modify the stator winding splice joining process to increase the reliability of stator winding splice joints in rotary electric machines. It would also be desirable to simplify the manufacturing processes and reduce assembly cycle time. It would also be desirable to reduce labor material and reworking costs and to provide a technique for joining the winding that reduces the production of waste and hazards, in particular compared to the conventional brazing process. The invention addresses the aforementioned problems of the conventional brazing process and in particular is embodied in the use of a GTAW process to weld stator winding splice joints to increase manufacturing efficiency and maintain product quality stability.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

The invention is advantageously and desirably embodied in at least one of two main weld configurations. One of the preferred weld configurations is a side weld and the second is a front weld. The side weld may be a vertical weld or a longitudinal weld.

Figure 1:
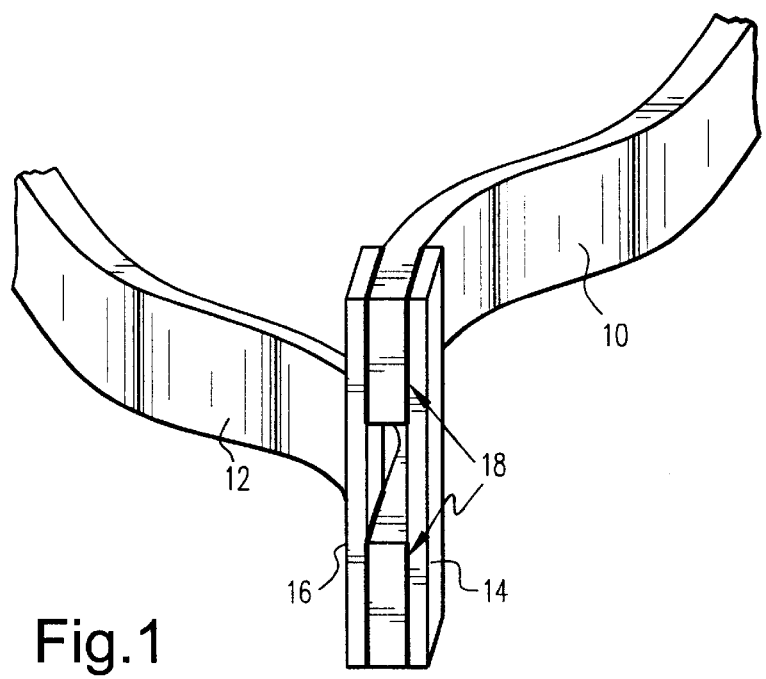
FIG. 1 is a schematic perspective view of a conventional stator winding splice joint.
Figure 2:
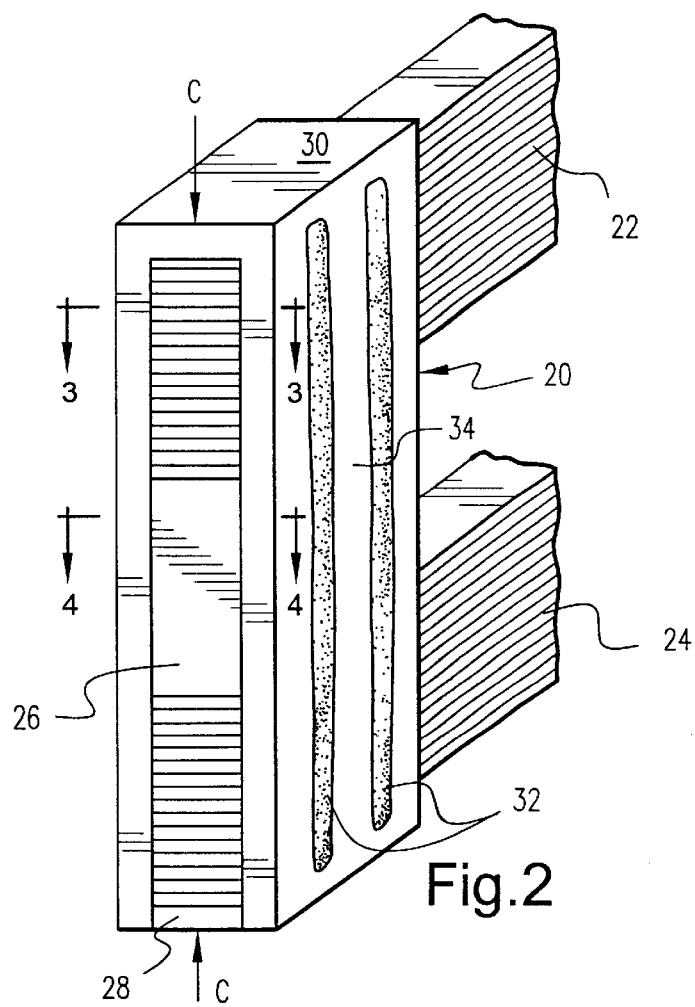
FIG. 2 is a schematic perspective view of a welded stator winding splice joint embodying the invention.
Figure 3:
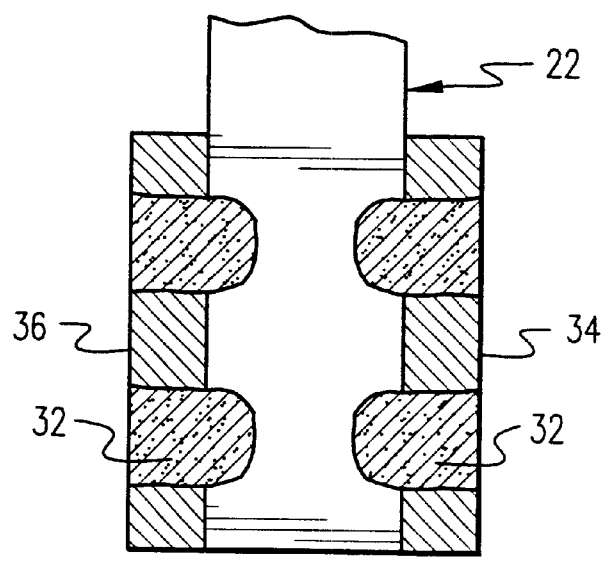
FIG. 3 is a cross-sectional view taken along line 3—3 of FIG. 2.
Figure 4:
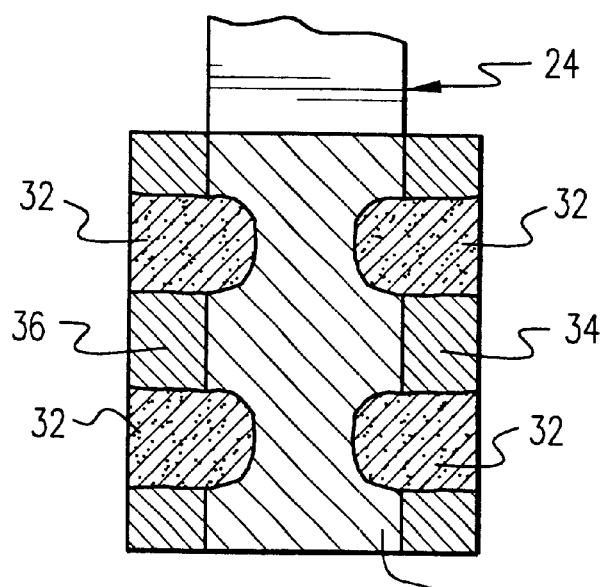
FIG. 4 is a cross-sectional view taken along line 4—4 of FIG. 2

A welded stator winding splice joint embodying the invention is schematically illustrated in FIG. 2. FIG. 2 illustrates an embodiment of a side weld configuration wherein the welding is carried on the two sides of the connection strap 20 as vertical welds. More specifically, in this embodiment, a U-shaped strap 20 holds the top and bottom bar leads 22, 24 of the stator winding. A middle copper filler 26 is inserted between the two bar leads and a bottom copper filler 28 is placed under the bottom bar lead. As can be seen from FIGS. 2 and 4, the copper filler 26 width corresponds to the coil (bar lead) width and the length of the copper filler is the same as the corresponding dimension of the connection strap 20. The copper fillers 26, 28 serve two primary functions. First, the copper fillers avoid the "meltdown" phenomena that usually occurs at weldment edges. Second, the copper fillers increase the effective flowing area of electric current to lower the joint electric resistance. A C-clamp schematically illustrated by arrows C, is applied on the strap top wall 30 and the bottom copper filler 28 to press the weldments tightly prior to welding.

Figure 5:
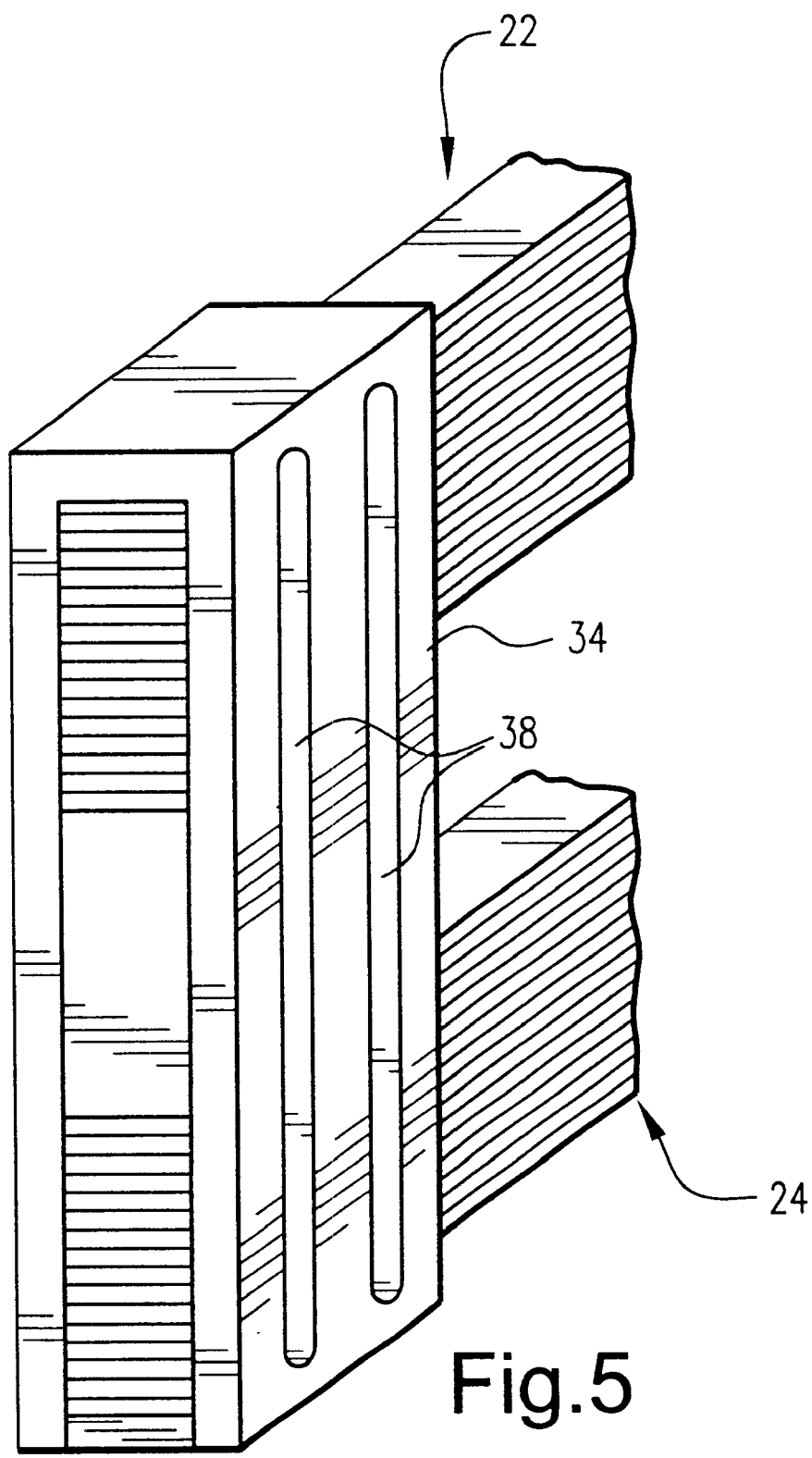
FIG. 5 is a schematic perspective view illustrating an alternate embodiment of the invention.

The GTAW torch (not shown) used for welding the splice joint is preferably specially designed to be able to fit in the small space between adjacent splice joints. The number of weld seams 32 provided is determined by current density through the joint and the electric resistance of the joint. Usually, two or more seams are desirably provided on each strap side wall 34, 36 to ensure low splice joint resistance and low copper loss. To get a wide welding width across the interface between the strap 20 and bar leads 22, 24, the GTAW polarity configuration is set as direct current electric position (DCEP). Where a thick strap is provided for high current density cases, welding slots 38, as illustrated in FIG. 5, are desirably formed on the strap side walls 34, 36 to help increase the penetration depth in the bar leads. In this embodiment, a filler metal, i.e., copper is needed to fill in the slots 38.

Figure 6:
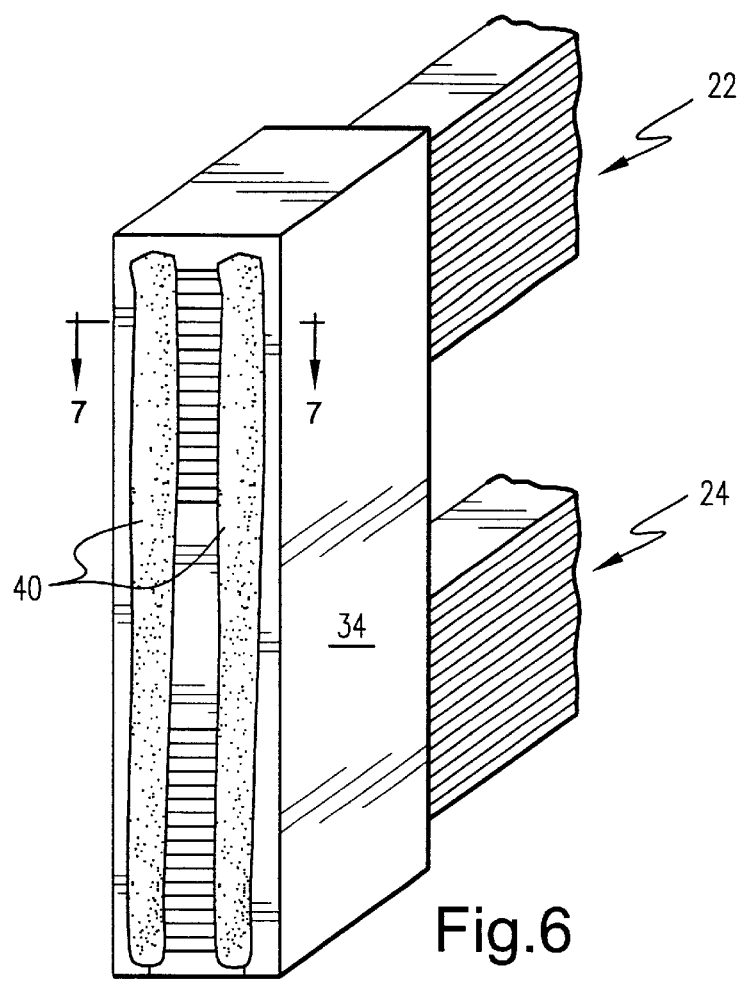
FIG. 6 is a schematic perspective view illustrating a welded splice joint according to a further alternate of the invention.
Figure 7:
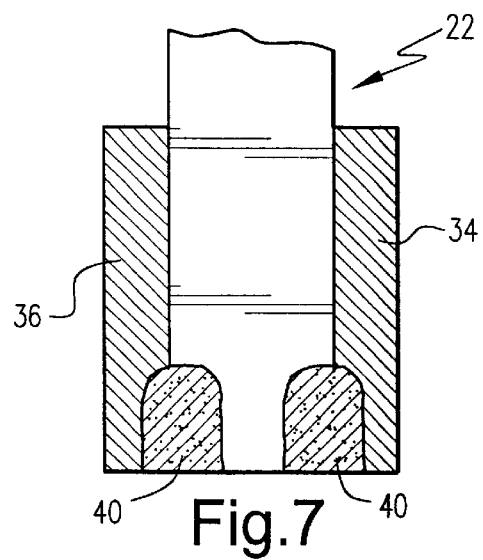
FIG. 7 is a schematic cross-sectional view taken along line 7—7 of FIG. 6.

A further alternative embodiment of the invention is illustrated in FIGS. 6 and 7. More particularly FIG. 6 is an exemplary embodiment of a front weld configuration wherein welding 40 is executed along the interfaces between the strap side walls 34, 36 and the bar leads 22, 24 at the coil front. Since the weldments are easy to access, a conventional torch can be directly employed in welding. In a high current density case, a combination of side welds 32 (FIG. 2) and front welds 40 (FIG. 6) will provide satisfactory welded joints. To obtain a deep penetration depth, the strap and the bar leads are prepared with some opening (not shown in FIG. 6) corresponding to the welding slots 38 illustrated in FIG. 5. For the front weld configuration of FIG. 6, direct current electro-negative (DCEN) is selected.

Figure 8:
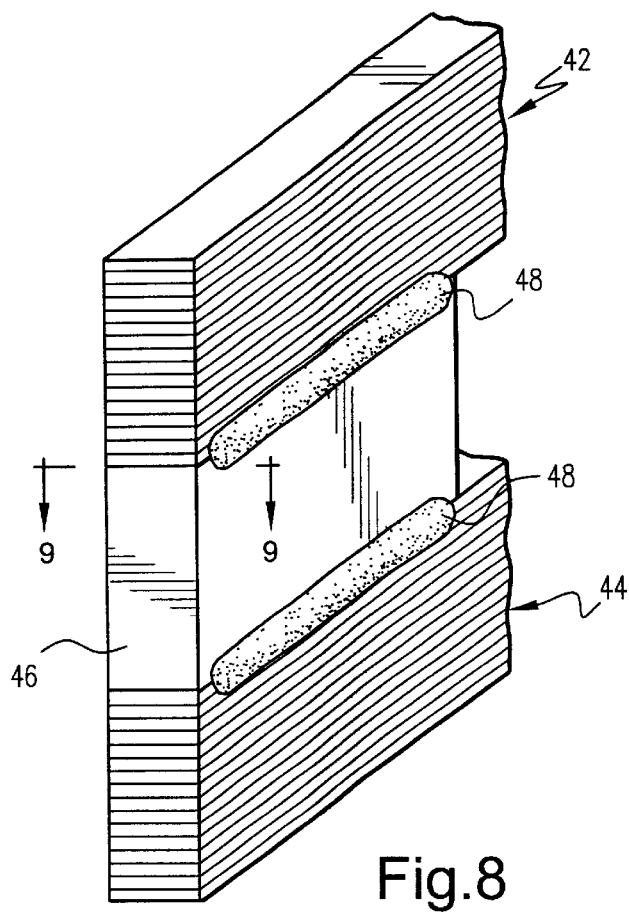
FIG. 8 is a schematic perspective view showing yet a further alternate embodiment of a welded stator winding splice joint embodying the invention.
Figure 9:
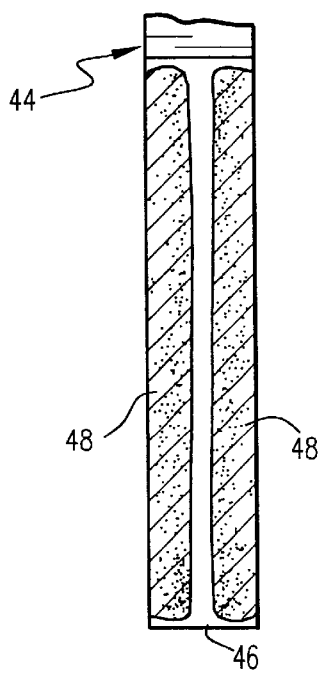
FIG. 9 is a cross-sectional view taken along line 9—9 of FIG. 8.

A further alternate and perhaps the, simplest embodiment of a welded splice joint as an embodiment of the invention is shown in FIG. 8. In this design, only one copper filler 46 is required to connect two bar leads 42, 44. Welding 48 is performed along the interfaces of the filler 46 and the bar leads 42, 44. Therefore, the alignment of the side surface of the bar leads has little impact on the welding quality. A lower joint electric resistance can be guaranteed by selecting a suitable welding length. The additional savings that are evidently achievable result from the elimination of the connection strap 20 used in the embodiments of FIGS. 2 and 6.

Figure 10:
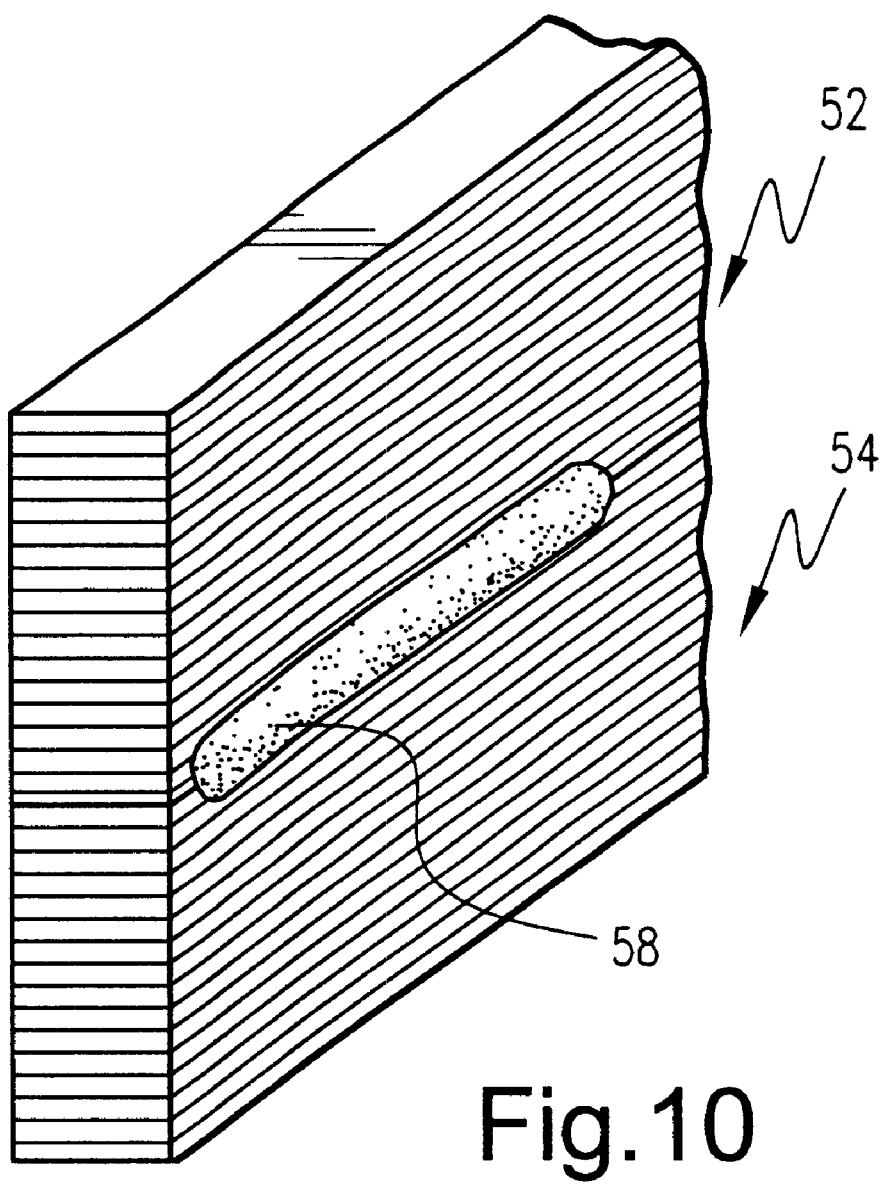
FIG. 10 is a schematic perspective view of a further alternate embodiment of the invention.

With reference to FIG. 10, to further simplify the welded splice joint design, the copper bar leads 52, 54 can be redesigned by changing their bending angles to allow them to contact each other. A single welding seam 58 is then made. In this manner, the middle copper filler 26, 46 can be eliminated. Therefore, a further cost reduction can be achieved in terms of resource and material savings.

As mentioned above, the welding machine is adapted to satisfy the particular requirements of the subject splice joint welding process. This can be done by improving a conventional welding machine to include automatic electro travel-speed control, high frequency starting capability, torch position/angle adjustment and 360° welding track rotating control to allow welding of any bar lead configuration. In order to enhance welding efficiency, multi-electrodes may be used to weld on the same side or two sides of the bar leads simultaneously.

As is evident to those skilled in this art, the aforedescribed welded stator winding splice joints may be adopted in all air-coil and hydrogen-coil generators with either forward flow or reverse flow ventilation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A stator winding splice joint comprising:
   a first bar lead having an upper surface, a bottom surface, and first and second side surfaces;
   a second bar lead having an upper surface, a bottom surface and first and second side surfaces;
   said first bar lead being disposed vertically above said second bar lead so that the first and second bar leads are vertically stacked; and
   a coupling comprising a plurality of vertically oriented welding seams on each lateral side of said vertically stacked bar leads for fixing said first bar lead vertically above said second bar lead.

2. A stator winding splice joint as in claim 1, wherein said coupling further comprises a connection strap disposed adjacent and extending between said first side of said first bar lead and said first side of said second bar lead.

3. A stator winding splice joint as in claim 2, wherein said connection strap is welded to each of said first and second bar leads by said welding seam.

4. A stator winding splice joint as in claim 2, wherein said connection strap is U-shaped and said bar leads are welded by a plurality of vertical welding seams extending vertically along at least a substantial portion of each said lateral side of each said bar lead.

5. A stator winding splice joint as in claim 1, further comprising a copper filler disposed between said bottom surface of said first bar lead and said upper surface of said second bar lead.

6. A stator winding splice joint as in claim 5, further comprising a second copper filler disposed below and in engagement with said bottom surface of said second bar lead.

7. A stator winding splice joint as in claim 5, wherein said copper metal filler has a width generally corresponding to a width of each of said first and second bar leads.

8. A stator winding splice joint comprising:
   a first bar lead having an upper surface, a bottom surface, and first and second side surfaces;
   a second bar lead having an upper surface, a bottom surface and first and second side surfaces; and
   a coupling comprising at least one welding seam for fixing said first bar lead vertically above said second bar lead, wherein said coupling further comprises a connection strap disposed adjacent and extending between said first side of said first bar lead and said first side of said second bar lead, further comprising at least one welding slot defined through said connection strap in a location corresponding to said welding seam.

9. A stator winding splice joint comprising:
a first bar lead having an upper surface, a bottom surface, and first and second side surfaces;
a second bar lead having an upper surface, a bottom surface and first and second side surfaces; and
said first bar lead being disposed vertically above said second bar lead so that the first and second bar leads are vertically stacked; and
a coupling comprising at least one welding seam on each lateral side of said vertically stacked bar leads for fixing said first bar lead vertically above said second bar lead, wherein said welding seam extends generally in an axial direction of said top bar lead so as to extend in parallel to said upper surface of said top bar lead.

10. A stator winding splice joint as in claim 9, further comprising a copper filler disposed between said bottom surface of said first bar lead and said upper surface of said second bar lead, wherein one said welding seam extends along each longitudinal side edge of a juncture of said first bar lead and said copper filler.

11. A stator winding splice joint as in claim 9, wherein one said welding seam extends along each longitudinal side edge of a juncture of said copper filler and said second bar lead.

12. A stator winding splice joint as in claim 9, wherein said bottom surface of said first bar lead is disposed in abutment with said upper surface of said second bar lead and one said welding seam extends along each longitudinal side edge of a juncture of said first bar lead and said second bar lead whereby said first and second bar leads are welded in abutting contact.

13. A method of forming a stator winding splice joint comprising:
providing a first bar lead having a top surface, bottom surface, first and second side surfaces, and a front end surface;
providing a second bar lead having a top surface, a bottom surface, first and second side surfaces, and a front end surface;
disposing said first and second bar leads in generally parallel relation so that said first bar lead is disposed vertically above said second bar lead with said bottom surface of said first bar lead facing said top surface of said bottom bar lead; and
operatively coupling said first bar lead and said second bar lead with a connection assembly comprising a plurality of one welding seams on each lateral side of said vertically stacked bar leads for fixedly coupling said first and second bar leads.

14. A method as in claim 13, wherein said connecting step comprises providing a connection strap in engagement with a first side surface of each of said first and second bar leads and so as to extend therebetween and gas tungsten arc welding said connection strap to said first and second bar leads.

15. A method as in claim 14, wherein said step of providing a connection strap comprises providing a connection strap of generally U-shape having a bar lead receiving receptacle between first and second side walls thereof.

16. A method as in claim 15, wherein said connection strap is welded to said first and second bar leads along said first and second side surfaces of said bar leads and said side walls of said connection strap.

17. A method as in claim 16, further comprising forming at least one slot in each said side wall of said connection strap and wherein said welding step comprises welding said connection strap to each said bar lead along said slots.

18. A method of forming a stator winding splice joint comprising:
providing a first bar lead having a top surface, bottom surface, first and second side surfaces, and a front end surface;
providing a second bar lead having a top surface, a bottom surface, first and second side surfaces, and a front end surface;
disposing said first and second bar leads in generally parallel relation so that said first bar lead is disposed vertically above said second bar lead with said bottom surface of said first bar lead facing said top surface of said bottom bar lead; and
operatively coupling said first bar lead and said second bar lead with a connection assembly comprising at least one welding seam on each lateral side of said vertically stacked bar leads for fixedly coupling said first and second bar leads, wherein said at least one welding seam extends generally in an axial direction of said top bar lead so as to extend in parallel to said upper surface of said top bar lead.

19. A method as in claim 18, further comprising disposing a middle copper filler between said first bar lead and said second bar lead.

20. A method as in claim 18, wherein said step of disposing said first bar lead vertically above said second bar lead includes disposing said first bar lead in contact with said upper surface of said second bar lead and welding said bar leads using gas tungsten arc welding along at least a portion of a juncture of said first and second bar leads.

21. A method as in claim 19, wherein said welding step comprises welding each said bar lead to said copper filler along a juncture thereof using gas tungsten arc welding.

22. A method of forming a stator winding splice joint comprising:
providing a first bar lead having a top surface, bottom surface, first and second side surfaces, and a front end surface;
providing a second bar lead having a top surface, a bottom surface, first and second side surfaces, and a front end surface;
disposing said first and second bar leads in generally parallel relation so that said first bar lead is disposed vertically above said second bar lead with said bottom surface of said first bar lead facing said top surface of said bottom bar lead; and
operatively coupling said first bar lead and said second bar lead with a connection assembly comprising at least one welding seam for fixedly coupling said first and second bar leads,
wherein said connecting step comprises providing a connection strap in engagement with a first side surface of each of said first and second bar leads and so as to extend therebetween, said connecting strap having at least one welding slot defined therein, and wherein said welding step comprises welding said connection strap to each said bar lead along said at least one slot.

* * * * *